(12) United States Patent
Tamura et al.

(10) Patent No.: US 6,432,607 B1
(45) Date of Patent: Aug. 13, 2002

(54) PHOTOCURABLE RESIN COMPOSITION AND METHOD OF OPTICALLY FORMING THREE-DIMENSIONAL SHAPE

(75) Inventors: Yorikazu Tamura; Tsuneo Hagiwara; Makoto Ohtake, all of Kawasaki (JP)

(73) Assignees: Teijin Seiki Co., Ltd.; Toagosei Co., Ltd., both of Tokyo (JP)

( * ) Notice: Subject to any disclaimer, the term of this patent is extended or adjusted under 35 U.S.C. 154(b) by 0 days.

(21) Appl. No.: 09/582,974

(22) PCT Filed: Nov. 8, 1999

(86) PCT No.: PCT/JP99/06209
§ 371 (c)(1),
(2), (4) Date: Jul. 7, 2000

(87) PCT Pub. No.: WO00/27895
PCT Pub. Date: May 18, 2000

(30) Foreign Application Priority Data

Nov. 10, 1998 (JP) ............................. 10-319351

(51) Int. Cl.$^7$ ........................... G03F 7/26; G03F 7/28; C08F 220/36; C08F 2/46
(52) U.S. Cl. ................. 430/269; 430/280.1; 430/283.1; 264/401; 522/167
(58) Field of Search ............................ 430/283.1, 280.1, 430/269; 522/167; 264/401

(56) References Cited

U.S. PATENT DOCUMENTS

| | | | | |
|---|---|---|---|---|
| 4,416,975 A | * | 11/1983 | Green et al. ................ | 430/327 |
| 4,626,497 A | | 12/1986 | Roth et al. ................ | 430/293 |
| 4,942,066 A | | 7/1990 | Fan et al. ................ | 427/54.1 |
| 5,002,855 A | | 3/1991 | Fan et al. ................ | 430/270.1 |
| 5,014,207 A | | 5/1991 | Lawton ................ | 364/468 |
| 6,369,124 B1 | * | 4/2002 | Hoyle et al. ................ | 522/63 |

FOREIGN PATENT DOCUMENTS

| | | |
|---|---|---|
| JP | 56-144478 | 11/1981 |
| JP | 62-35966 | 2/1987 |
| JP | 1-204915 | 8/1989 |
| JP | 1-213304 | 8/1989 |
| JP | 1-242569 | 9/1989 |
| JP | 2-28261 | 1/1990 |
| JP | 2-75617 | 3/1990 |
| JP | 2-113925 | 4/1990 |
| JP | 2-145616 | 6/1990 |
| JP | 2-153722 | 6/1990 |
| JP | 3-15520 | 1/1991 |
| JP | 3-21432 | 1/1991 |
| JP | 3-41126 | 2/1991 |
| JP | 3-104626 | 5/1991 |
| JP | 3-114732 | 5/1991 |
| JP | 3-114734 | 5/1991 |
| JP | 3-271272-a | * 12/1991 |
| JP | 5-196691 | 8/1993 |
| JP | 5-196692 | 8/1993 |
| JP | 7300458 | 11/1995 |
| JP | 8-151559 | 6/1996 |
| JP | 10-36462 | 2/1998 |

OTHER PUBLICATIONS

Kojima et al, CA 116:215093, English abstract of JP 3–271272 of Dec. 1991, ACS, 2 pages.*
Okazaki et al, CA 128:193833, English abstract of JP 10–36462 of Feb. 10, 1998, ACS, 2 pages.*
Derwent –Acc–No. 1992–021543, English abstract of JP 03–271272 A of Dec. 1991, from East Database, Derwent Information Ltd, 2 pages.*
Kojima et al, JP403271272A, English abstract of JP03–271272 of Dec. 1991 from JPO and JPIO, copyright 1991.*
Nishama et al, CA 124:177899, English abstract of JP 07–300458 of Nov. 1995, ACS, 4 pages.

* cited by examiner

*Primary Examiner*—Cynthia Hamilton
(74) *Attorney, Agent, or Firm*—Anderson Kill & Olick; Eugene Lieberstein; Michael N. Meller

(57) ABSTRACT

A photocurable resin composition capable of producing a three-dimensional object which has excellent dimensional accuracy with a small volume shrinkage factor and excellent heat resistance with a high heat distortion temperature as well as excellent transparency and mechanical properties.

This composition comprises at least one imidated acrylic compound (i) represented by the following formula:

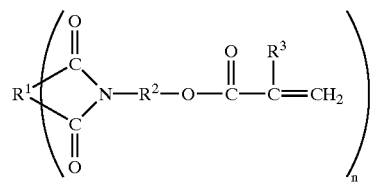

wherein $R^1$ is an alicyclic group, an aromatic group or an aliphatic group which may be substituted, $R^2$ is a residual group of amino alcohol, $R^3$ is hydrogen atom or methyl group, and n is 1 or 2; (ii) a radical polymerizable compound and/or a cationic polymerizable compound other than the above imidated acrylic compound; and (iii) a photopolymerization initiator. The weight ratio of the imidated acrylic compound to the radical polymerizable compound and/or cationic polymerizable compound is 80:20 to 10:90.

1 Claim, No Drawings

PHOTOCURABLE RESIN COMPOSITION AND METHOD OF OPTICALLY FORMING THREE-DIMENSIONAL SHAPE

FIELD OF THE INVENTION

The present invention relates to a photocurable resin composition and to a process for producing a three-dimensional object from the photocurable resin composition. More specifically, it relates to a photocurable resin composition which can give moldings and three-dimensional objects having excellent dimensional accuracy with a small volume shrinkage factor at the time of photo curing and excellent heat resistance with a high heat distortion temperature as well as excellent transparency and mechanical properties such as tensile strength and to a process for producing a three-dimensional object from the photocurable resin composition by stereolithography.

PRIOR ART

Generally speaking, liquid photocurable resin compositions are widely used as coatings (especially hard coatings), photoresists, dental materials and the like. Special attention has recently been paid to a process for optically shaping a photocurable resin composition into a three-dimensional object based on data input into a 3-D CAD. As for art of stereolithography, JP-A 56-144478 (the term "JP-A" as used herein means an "unexamined published Japanese patent application") discloses stereolithography method for producing a three-dimensional object by repeating the step of curing a liquid photocurable resin with a required amount of controlled light energy to form a thin layer, the step of further supplying a liquid photocurable resin on the top of the thin film and the step of exposing the photocurable resin to light under control to cure it so as to form a laminate. JP-A 60-247515 proposes its basic application method. Thereafter, many proposals for art of stereolithography have been made by JP-A 62-35966, JP-A 1-204915, JP-A 2-113925, JP-A 2-145616, JP-A 2-153722, JP-A 3-15520, JP-A 3-21432 and JP-A 3-41126.

A typical process for optically producing a three-dimensional object is a process for producing a three-dimensional object having a final shape by repeating lamination operation consisting of the steps of exposing selectively the liquid surface of a liquid photocurable resin composition in a shaping bath to ultraviolet laser light which is controlled by a computer to cure it to a predetermined thickness so as to obtain a desired pattern, supplying a liquid resin composition of one layer onto the cured layer and exposing it to ultraviolet laser light to cure it so as to form another cured layer on the previous cured layer. This process has recently been attracting special attention because a three-dimensional object of interest can be easily produced in a relatively short period of time even though the shape of the object is very complex.

A photocurable resin composition comprising a curable resin such as an unsaturated polyester, epoxy (meth)acrylate, urethane (meth)acrylate or (meth)acrylic ester monomer, and a photopolymerization initiator is widely used in coatings, photoresists, dental materials and the like.

A photocurable resin composition used in stereolithography method comprises at least one photopolymerizable compound such as a photopolymerizable modified (poly) urethane (meth)acrylate-based compound, oligoester acrylate-based compound, epoxy acrylate-based compound, epoxy-based compound, polyimide-based compound, aminoalkyd-based compound or vinyl ether-based compound as the main component and a photopolymerization initiator. In recent years, JP-A 1-204915, JP-A 1-213304, JP-A 2-28261, JP-A 2-75617, JP-A 2-145616, JP-A 3-104626, JP-A 3-114732 and JP-A 3-114734 disclose various improving technologies.

The photocurable resin composition used for the production of three-dimensional objects must be a low-viscosity liquid, have small volume shrinkage at the time of curing and give a three-dimensional object obtained by photo curing having excellent mechanical properties from the viewpoints of handling properties, shaping speed and shaping accuracy. In recent years, demand and application of three-dimensional objects formed by stereolithography have been expanding and three-dimensional objects having excellent heat resistance with a high heat distortion temperature and excellent transparency in addition to the above characteristic properties have been in demand according to application purpose. Three-dimensional objects having small volume shrinkage at the time of photo curing, high heat distortion temperature and excellent transparency are valued highly as three-dimensional objects used for the design of a complicated heating medium circuit and three-dimensional objects used for the analysis of the behavior of a heating medium having a complicated structure.

To obtain a three-dimensional object having improved heat resistance by stereolithography, there have been studied a method for introducing a benzene ring into the molecule of a photocurable resin, a method for increasing the crosslinking density of an optically cured product, and the like. However, heat distortion temperature under high load is 70 to 80° C. at the best in these cases. Therefore, these methods are unsatisfactory in terms of heat resistance. In addition, when the heat resistance of an optically cured product is to be improved, volume shrinkage at the time of curing becomes large, thereby reducing dimensional accuracy.

Generally speaking, volume shrinkage at the time of curing tends to become large by though the improvement of heat resistance is expected from increasing the crosslinking density of a photocurable resin composition an increase in the crosslinking density. Therefore, the improvement of heat resistance and the reduction of volume shrinkage at the time of curing are contradictory to each other. As one of means of breaking through this contradictory relationship, the inventors of the present invention have developed and proposed a photocurable resin composition prepared by blending a filler into a specific photocurable resin (see JP-A 5-196691 and JP-A 5-196692). When this photocurable resin composition is used, a shaped object having excellent heat resistance and a small volume shrinkage factor is obtained, which breaks through the above contradictory relationship. When the present inventors have conducted further studies based on the above invention, it has been found that there is still room for improvement in terms of handling properties at the time of shaping because the photocurable resin composition shows high viscosity and thixotropy from flowability and viscosity thereof owing to the filler contained therein.

SUMMARY OF THE INVENTION

It is an object of the present invention to provide a photocurable resin composition which is excellent in handling properties because it is a:low-viscosity liquid, can be optically cured in a short period of time, has excellent dimensional accuracy with small volume shrinkage at the time of photo curing, and can give moldings, three-dimensional objects and other cured products having excellent heat resistance with a high heat distortion temperature as well as excellent transparency and mechanical properties such tensile strength.

It is another object of the present invention to provide a process for producing a three-dimensional object from the photocurable resin composition of the present invention by stereolithography.

Other objects and advantages of the present invention will become apparent from the following description.

According to the present invention, firstly, the above objects and advantages of the present invention are attained by a photocurable resin composition comprising:

(i) at least one imidated acrylic compound represented by the following formula (I):

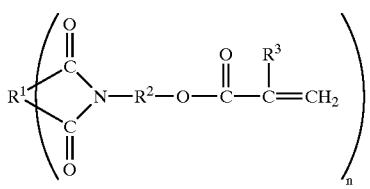
(1)

wherein $R^1$ is an alicyclic group which may be substituted, an aromatic group which may be substituted or an aliphatic group which may be substituted, $R^2$ is a residual group of aminoalcohol, $R^3$ is hydrogen atom or methyl group, and n is 1 or 2;

(ii) at least one polymerizable compound selected from the group consisting of a radical polymerizable compound and a cationic polymerizable compound other than the above imidated acrylic compound; and (iii) a photopolymerization initiator, the weight ratio of the imidated acrylic compound (i) to the polymerizable compound (ii) being 80:20 to 10:90.

Secondly, the above objects and advantages of the present invention are attained by a process for producing a three-dimensional object comprising the step of optically shaping the above photocurable resin composition of the present invention into a three-dimensional object.

The present inventors have conducted intensive studies and have found the following:

(1) an imidated acrylic compound having a specific chemical structure is extremely effective in attaining the above objects;

(2) a liquid photocurable resin composition which has low viscosity and excellent handling properties is obtained by adding other radical polymerizable compound and/or cationic polymerizable compound and a photopolymerization initiator to this imidated acrylic compound;

(3) when this photocurable resin composition is exposed to light, it can be cured in a short period of time;

(4) three-dimensional objects and other moldings having small volume shrinkage at the time of curing and desired shapes and sizes can be produced with high dimensional accuracy; and (5) moldings and three-dimensional objects obtained by photo curing have excellent heat resistance with a high heat distortion temperature as well as excellent transparency and mechanical properties.

Thus, the present invention has been accomplished by the above findings.

DETAILED DESCRIPTION OF THE PREFERRED EMBODIMENTS

A description is first given of the imidated acrylic compound (I) used in the photocurable;resin composition of the present invention.

In the imidated acrylic compound (I) used in the photocurable resin composition of the present invention, $R^1$ is an alicyclic group which may be substituted, aromatic group which may be substituted or aliphatic group which may be substituted. $R^1$ is, for example, a residual group derived from an alicyclic dicarboxylic acid, aliphatic tetracarboxylic acid or anhydride thereof which is substituted or not substituted with a substituent such as an alkyl group, halogen atom or nitro group; a residual group derived from an aromatic dicarboxylic acid, aromatic tetracarboxylic acid or anhydride thereof which is substituted or not substituted with a substituent such as an alkyl group, halogen atom or nitro group; and a residual group derived from an aliphatic dicarboxylic acid, aliphatic tetracarboxylic acid (preferably saturated aliphatic dicarboxylic acid or tetracarboxylic acid) or anhydride thereof which is substituted or not substituted with a substituent such as a halogen atom or nitro group. Specific examples of $R^1$ include substituted and non-substituted cyclohexyldicarboxylic acids and cyclohexyltetracarboxylic acids; substituted and non-substituted hydrogenated bisphenyltetracarboxylic acids; substituted and non-substituted hydrogenated biphenyl ether tetracarboxylic acids; and residual dicarboxylic acid and tetracarboxylic acid groups derived from dicarboxylic acids, tetracarboxylic acids and anhydrides thereof such as pyromellitic acid, bisphenyltetracarboxylic acid and succinic acid.

In the imidated acrylic compound (I) used in the photocurable resin composition of the present invention, $R^2$ is a residual amino alcohol group. $R^2$ is preferably a residual amino alcohol group (that is, a straight chain- or branched-chain alkylene group having 2 to 10 carbon atoms) represented by the general formula $H_2N-R^4-OH$ ($R^4$ is a straight chain- or branched-chain alkylene group having 2 to 10 carbon atoms) from the viewpoints of the synthesis ease of the imidated acrylic compound (I) and the toughness and economy of the finally obtained imidated acrylic compound (I). It is more preferably an alkylene group having 2 to 4 carbon atoms, such as ethylene group, n-propylene group, isopropylene group or n-butylene group.

In the imidated acrylic compound (I), $R^3$ is a hydrogen atom or methyl group, and n is 1 or 2.

An imidated acrylic compound (I) in which n is 1 has one (meth)acrylate group in the molecule and an imidated acrylic compound (I) in which n is 2 has two (meth)acrylate groups in the molecule.

The process for producing the imidated acrylic compound (I) used in the present invention is not particularly limited but the following typical process may be used.

Production Example of Imidated Acrylic Compound (I)

A dicarboxylic or tetracarboxylic anhydride represented by the following formula (II):

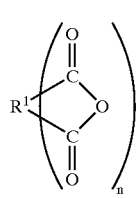
(II)

wherein $R^1$ and n are as defined hereinabove, and an amino alcohol represented by the following formula (III):

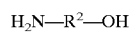
(III)

wherein $R^2$ is as defined hereinabove, are reacted with each other to give an imidated alcohol compound represented by the following formula (IV):

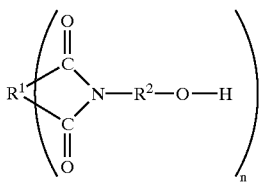

wherein $R^1$, $R^2$ and n are as defined hereinabove, and the imidated alcohol compound is reacted with (meth)acrylic acid or (meth)acrylic acid halide to give an imidated acrylic compound (I) represented by the above formula (I).

Typical examples of the dicarboxylic anhydride or tetracarboxylic anhydride represented by the formula (II) used in the production of the above imidated acrylic compound (I) include substituted and non-substituted cyclohexyldicarboxylic acid anhydrides, cyclohexyltetracarboxylic anhydrides, substituted and non-substituted hydrogenated biphenyltetracarboxylic anhydrides, substituted and non-substituted hydrogenated biphenol ether tetracarboxylic anhydrides, pyromellitic anhydride, biphenyltetracarboxylic anhydrides, succinic anhydride and the like.

The above amino alcohol represented by the formula (III) used in the production of the above imidated acrylic compound (I) is, for example, an amino alcohol represented by the general formula $H_2N$—$R^4$-OH ($R^4$ is a straight chain- or branched chain-alkylene group having 2 to 10 carbon atoms). Ethyl amino alcohols, n-propyl amino alcohols, isopropyl amino alcohols and n-butyl amino alcohols are particularly preferred as the amino alcohol.

The photocurable resin composition of the present invention contains at least one of other radical polymerizable compound (may be simply referred to as "radical polymerizable compound" hereinafter) and cationic polymerizable compound, with the above imidated acrylic compound (I).

Any radical polymerizable compound having a carbon-carbon unsaturated bond may be used if it can react with the imidated acrylic compound (I) or another radical polymerizable compound upon exposure to form a cured product. Acrylic compounds, allyl compound and/or vinyl lactams are particularly preferred as the radical polymerizable compound.

The radical polymerizable compound may be monofunctional or polyfunctional, or a combination of a monofunctional compound and a polyfunctional compound may be used. Further, the radical polymerizable compound may be a low molecular weight monomer, oligomer or what has a high molecular weight up to a certain degree as the case may be. The photocurable resin composition of the present invention may contain only one radical polymerizable compound or two or more radical polymerizable compounds.

Illustrative examples of the radical polymerizable compound which can be used in the photocurable resin composition of the present invention include monofunctional radical polymerizable compounds such as (meth)acrylates including isobornyl (meth)acrylate, bornyl (meth)acrylate, dicyclopentenyl (meth)acrylate, 2-hydroxyethyl (meth) acrylate, 2-hydroxypropyl (meth)acrylate, (poly)propylene glycol mono(meth)acrylate and t-butyl (meth)acrylate, (meth)acrylamides including morpholine (meth)acrylamide, N-vinyl caprolactone and styrene; and polyfunctional radical polymerizable compounds such as trimethylolpropane tri(meth)acrylate, ethylene oxide modified trimethylolpropane tri(meth)acrylate, ethylene glycol di(meth)acrylate, diethylene glycol (meth)acrylate, triethylene glycol (meth) acrylate, tetraethylene glycol di(meth)acrylate, polyethylene glycol (meth)acrylate, 1,4-butanediol di(meth)acrylate, 1,6-hexanediol di(meth)acrylate, neopentyl glycol di(meth) acrylate, dicyclopentenyl di(meth)acrylate, diallyl phthalate, diallyl fumarate and ethylene oxide modified bisphenol A diacrylate. They may be used alone or in combination of two or more.

Besides the above radical polymerizable compounds, urethanated acrylic compounds, epoxy (meth)acrylate compounds and other ester (meth)acrylates which have been conventionally used in resin compositions for optically shaping three-dimensional objects may be used.

In the photocurable resin composition of the present invention, out of the above radical polymerizable compounds, morpholine (meth)acrylamide, dicyclopentenyl di(meth)acrylate, N-vinylcaprolactam and urethanated acrylate are preferred. Urethanated acrylate and morpholine (meth)acrylamide are particularly preferred. In this case, there can be obtained a photocurable resin composition which gives moldings, three-dimensional objects and other optically cured products having excellent dimensional accuracy with a small volume shrinkage factor and excellent heat resistance with a high heat distortion temperature as well as excellent transparency and mechanical properties.

Illustrative examples of the cationic polymerizable compound which can be used in the photocurable resin composition of the present invention include epoxy-based compounds such as aliphatic diepoxy compounds, alicyclic diepoxy compounds and aromatic diepoxy compounds; and vinyl ether-based compounds such as aliphatic divinyl ether compounds, alicyclic divinyl ether compounds and aromatic divinyl ether compounds. They may be used alone or in combination of two or more.

When a cationic polymerizable compound is used, it is recommended to use an imidated acrylic compound (I), radical polymerizable compound and cationic polymerizable compound rather than to use an imidated acrylic compound (I) and cationic polymerizable compound, from the viewpoints of photo curing properties, heat resistance and mechanical properties.

In the photocurable resin composition of the present invention, the weight ratio of the imidated acrylic compound (I) to the radical polymerizable compound and/or cationic polymerizable compound must be 80:20 to 10:90, preferably 65:35 to 25:75, more preferably 60:40 to 35:65.

In the photocurable resin composition, when the amount of the imidated acrylic compound (I) is smaller than 10 wt % based on the total weight of the imidated acrylic compound (I) and radical polymerizable compound and/or cationic polymerizable compound, a molded product or three-dimensional object having high heat resistance, tensile strength and rigidity based on an imide group is hardly obtained when the photocurable resin composition is optically cured and when the amount is larger than 80 wt %, the viscosity of the photocurable resin composition becomes too high, thereby deteriorating handling properties, moldability and shapability. When the photocurable resin composition is used for stereolithography method, a desired three-dimensional object of interest cannot be produced smoothly.

Further, any optically radical polymerization initiator and/or optically cationic polymerization initiator which have/has been used in photocurable resin compositions may be used as the photopolymerization initiator used in the photocurable resin composition of the present invention.

Illustrative examples of the photopolymerization initiator (optically radical polymerization initiator) which can be used in the photocurable resin of the present invention include 2,2-dimethoxy-2-phenylacetophenone, 1-hydroxycyclohexylphenyl ketone, diethpxyacetophenone, acetophenone, 3-methylacetophenone, 2-hydroxymethyl-1-phenylpropan-1-one, 4'-isopropyl-2-hydroxy-2-propiophenone, 2-hydroxy-2-methyl-propiophenone, p-dimethylaminoacetophenone, p-t-butyldichloroacetophenone, p-t-butyldichloroacetophenone, p-azidobenzalacetophenone, 1-hydroxycyclohexylphenyl ketone, benzophenone, methyl o-benzoylbenzoate, Michler's ketone, 4,4'-bisdiethylaminobenzophenone, xanthone, fluorenone, fluorene, benzaldehyde, anthraquinone, triphenylamine and carbazole.

The optically cationic polymerization initiator is not limited to a particular kind and any conventionally known optically cationic polymerization initiator may be used. It is generally known that an optically cationic polymerization initiator is deactivated in the presence of a basic compound. Since the imidated acrylic compound (I) used in the present invention does not deactivate an optically cationic polymerization initiator, according to the present invention, a desired cured product can be formed from a composition comprising the imidated acrylic compound (I) and the cationic polymerizable compound by optical polymerization.

The amount of the photopolymerization initiator may change according to the types of the imidated acrylic compound (I), radical polymerizable compound, cationic polymerizable compound and photopolymerization initiator. It is preferably 0.1 to 10 wt %, more preferably 1 to 5 wt % based on the total weight of the imidated acrylic compound (I) and radical polymerizable compound and/or cationic polymerizable compound.

The photocurable resin composition of the present invention may contain a leveling agent, surfactant, organic polymer modifier, organic plasticizer and organic or inorganic solid fine particles as required, in addition to the above components. Illustrative examples of the organic solid fine particles include crosslinked polystyrene-based fine particles, crosslinked polymethacrylate-based fine particles, polyethylene-based fine particles, polypropylene-based fine particles and the like. Illustrative examples of the inorganic solid fine particles include glass beads, talc fine particles, silicon oxide fine particles and the like. When organic solid fine particles and/or inorganic solid fine particles are contained in the photocurable resin composition of the present invention and fine particles treated with a silane coupling agent such as aminosilane, epoxysilane or acrylsilane are used, the mechanical strength of a cured product obtained by photo curing is improved in most cases advantageously. To contain polyethylene-based solid fine particles and/or polypropylene-based solid fine particles treated with a silane coupling agent in the photocurable resin composition, it is preferred to use polyethylene-based solid fine particles and/or polypropylene-based solid fine particles containing approximately 1 to 10 wt % of an acrylic acid-based compound because compatibility of the fine particles for the silane coupling agent is improved advantageously. When the above organic solid fine particles and/or inorganic solid fine particles are contained in the photocurable resin composition of the present invention, the heat resistance of the obtained optical cured product is further improved in most cases. To further improve heat resistance and retain excellent transparency, it is desired that the above solid fine particles should be reduced in size to a submicron order and subjected to an appropriate surface treatment to be stably dispersed in the photocurable resin composition in order to suppress an increase in the viscosity of the photocurable resin composition.

The viscosity of the photocurable resin composition of the present invention can be adjusted according to application purpose and use. When it is measured with a rotary B type viscometer, it is preferably approximately 100 to 100,000 cps at normal temperature (25° C.) from the viewpoints of handling properties, moldability and 3-D shapability, more preferably approximately 300 to 50,000 cps. Particularly when the photocurable resin composition of the present invention is used to optically shape a three-dimensional object, the viscosity at normal temperature of the photocurable resin composition is desirably controlled to 300 to 10,000 cps to improve handling properties at the time of shaping and to smoothly produce a three-dimensional object of interest with high dimensional accuracy. The viscosity of the photocurable resin composition can be controlled by selecting the types of the imidated acrylic compound (I) and the radical polymerizable compound and the weight ratio thereof.

The photocurable resin composition of the present invention can be generally preserved at a temperature of 10 to 400° C. for about 6 to 18 months while preventing modification and polymerization thereof and retaining excellent optical curability when it is stored in state such that light can be shielded.

The method for preparing the photocurable resin composition of the present invention is not particularly limited. The photocurable resin composition may be prepared by mixing together the imidated acrylic compound (I) and radical polymerizable compound and/or cationic polymerizable compound in the above ratio and further mixing a photopolymerization initiator.

The photocurable resin composition of the present invention can be effectively used for the production of various moldings and three-dimensional objects, making use of its characteristic properties such as excellent dimensional accuracy with a small volume shrinkage factor at the time of photo curing, excellent mechanical properties such as high tensile strength, high heat resistance and transparency. It is particularly useful for the production of three-dimensional objects by stereolithography method.

To optically shape the photocurable resin composition of the present invention into a three-dimensional object, any conventionally known stereolithography method and device may be used. In the present invention, activation energy beams from an Ar laser, He—Cd laser, xenon lamp, metal halide lamp, mercury lamp or fluorescent lamp are preferably used as light energy for curing a resin. Laser beams are particularly preferred. When laser beams are used as activation energy beams, it is possible to shorten the shaping time by increasing the energy level and to obtain a three-dimensional object with high shaping accuracy by making use of the excellent convergence of laser beams.

To optically shape the photocurable resin composition of the present invention into an optical three-dimensional object, any conventionally known method and optical shaping system may be used without restriction as described above. A typical example of stereolithography method which is preferably used in the present invention is to obtain a three-dimensional object of interest in the end by repeating a lamination operation which consists of the steps of selectively irradiating a liquid photocurable resin composition containing an optical energy absorbing agent with activation energy beams to obtain a cured layer having a desired pattern, supplying an uncured liquid photocurable resin composition onto the cured layer, irradiating the photocurable resin composition with activation energy beams to form a cured layer on the above cured layer.

The three-dimensional object thus obtained may be used directly or after it is post-cured by exposure or heat to further improve mechanical properties and shape stability thereof.

The structure, shape and size of the three-dimensional object are not particularly limited and may be determined according to each application purpose. Typical application fields of the stereolithography method of the present invention include the manufacture of models for the verification of appearance designs in the course of design, models for checking the functionality of parts, base models for the production of resin molds or metal molds for the manufacture of casting molds, and direct molds for the trial production of metal molds. More specifically, the stereolithography method of the present invention is used for the manufacture of models or processing models for precision parts, electric and electronic parts, furniture, construction structures, auto parts, containers, cast products, metal molds and matrices. It can be very effectively used for the trial production of high-temperature parts, the design of very complicated heating medium circuits and the production of parts for analysis and planning of the behavior of very complicated structured heating media, making use of excellent heat resistance and transparency in particular.

EXAMPLES

The following examples are provided for the purpose of further illustrating the present invention but are in no way to be taken as limiting.

Synthesis Example 1: Formation of Imidated Acrylic Compound (1) 1,000 g of dehydrated toluene and 1,600 g of cyclohexyldicarboxylic anhydride were charged into a three-necked flask having an inner volume of 5 liters and equipped with a stirrer, temperature regulator, thermometer and condenser. Meanwhile, a solution prepared by dissolving 610 g of aminoethyl alcohol in 300 g of dehydrated toluene was charged into a dropping funnel and the resultant aminoethyl alcohol solution in the dropping funnel was added dropwise to the three-necked flask under agitation at room temperature over 1 hour. After the addition of the whole amount, a reaction was carried out under agitation at room temperature for another 2 hours. Thereafter, the contents of the flask were heated and reacted under the reflux of toluene for 3 hours, and toluene was distilled off from the reaction mixture to give 1,624 g of a reaction product (reaction rate of 80%). It was confirmed from the results of elemental analysis and IR analysis that the reaction product was an imidated alcohol represented by the following chemical formula:

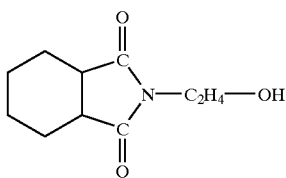

(2) 1,500 g of the imidated alcohol obtained in (1) above and 1,000 g of dehydrated toluene were charged into a three-necked flask having an inner volume of 5 liters and equipped with a stirrer, temperature regulator, thermometer and condenser. Meanwhile, a solution prepared by dissolving 685 g of acrylic acid chloride in 600 g of dehydrated toluene was charged into a dropping funnel and the resulting acrylic acid chloride solution in the dropping funnel was added dropwise to the three-necked flask under agitation at room temperature over 1 hour. After the addition of the whole amount, a reaction was carried out under agitation at room temperature for another 2 hours. Thereafter, toluene was distilled off from the reaction mixture in the flask to give 1,300 g of an imidated acrylate of interest represented by the following chemical formula (to be referred to as "imidated acrylate A" hereinafter). The obtained imidated acrylate A was a liquid having a viscosity of 700 cps at room temperature.

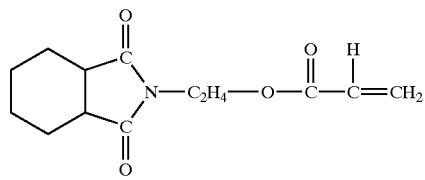

Synthesis Example 2: Formation of Imidated Acrylic Compound (I)

(1) 1,000 g of dehydrated toluene and 1,530 g of hydrogenated diphenyltetracarboxylic anhydride were charged into a three-necked flask having an inner volume of 5 liters and equipped with a stirrer, temperature regulator, thermometer and condenser. Meanwhile, a solution prepared by dissolving 305 g of aminoethyl alcohol in 300 g of dehydrated toluene was charged into a dropping funnel and the resultant aminoethyl alcohol solution in the dropping funnel was added dropwise to the three-necked flask under agitation at room temperature over 1 hour. After the addition of the whole amount, a reaction was carried out under agitation at room temperature for another 2 hours. Thereafter, the contents of the flask were heated and reacted under the reflux of toluene for 3 hours and toluene was distilled off from the reaction mixture to give 1,259 g of a reaction product (reaction rate of 70%). It was confirmed from the results of elemental analysis and IR analysis that the reaction product was an imidated alcohol represented by the following chemical formula:

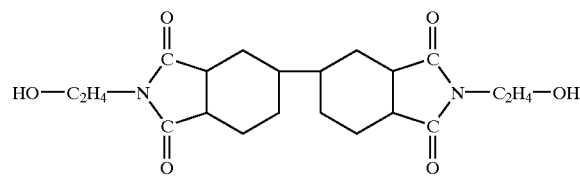

(2) 1,200 g of the imidated alcohol obtained in (1) above and 1,000 g of dehydrated toluene were charged into a three-necked flask having an inner volume of 5 liters and equipped with a stirrer, temperature regulator, thermometer and condenser. Meanwhile, a solution prepared by dissolving 551 g of acrylic acid chloride in 600 g of dehydrated toluene was charged into a dropping funnel and the resulting acrylic acid chloride solution in the dropping funnel was added dropwise to the three-necked flask under agitation at room temperature over 1 hour. After the addition of the whole amount, a reaction was carried out under agitation at room temperature for another 2 hours. Thereafter, toluene was distilled off from the reaction mixture, in the flask to give 1,148 g of an imidated acrylate of interest represented by the following chemical formula (to be referred to as "imidated acrylate B" hereinafter).

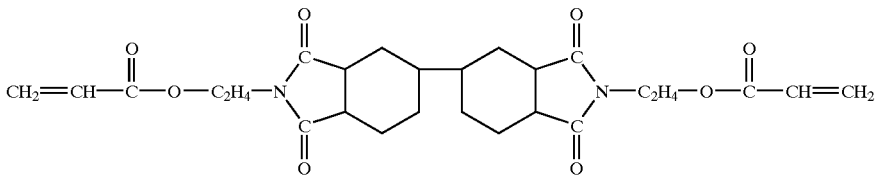

Synthesis Example 3: Formation of Radical Polymerizable Compound Mixture (1) 888 g of isophorone diisocyanate, 906 g of morpholine acrylamide and 1.0 g of dibutyltin dilaurate were charged into a three-necked flask having an inner volume of 5 liters and equipped with a stirrer, temperature regulator, thermometer and condenser and the flask was heated be inner temperature of to 80 to 90° C. with an oil bath.

(2) A solution prepared by uniformly mixing and dissolving 0.7 g of methyl hydroquinone in 856 g of glycerin monomethacrylate monoacrylate was charged into a dropping funnel equipped with a side pipe maintained at 50° C. and the resulting solution in this dropping funnel was added dropwise to and mixed with the contents of the flask (1) under agitation while the temperature of the contents of the flask was maintained at 80 to 90° C. in a nitrogen atmosphere and reacted under agitation at the same temperature for 2 hours.

(3) After the temperature of the contents of the flask was lowered to 600° C., 366 g of a pentaerythritol adduct with 4 moles of propylene oxide (1 mole of propylene oxide was added to each of the four hydroxyl groups of pentaerythritol) charged into another dropping funnel was added dropwise to the flask quickly and reacted for 4 hours while the temperature of the contents of the flask was maintained at 80 to 90° C. to give a radical polymerizable compound mixture containing an urethanated acrylic compound which was then taken out from the flask while it was hot. The obtained radical polymerizable compound mixture was a colorless viscous liquid at normal temperature (25° C.).

Example 1: Preparation of Photocurable Resin Composition 1,212 g of the imidated acrylate A obtained in Synthesis Example 1, 2,020 g of the radical polymerizable compound mixture obtained in Synthesis Example 3 and 808 g of dicyclopentanyl diacrylate were charged into a three-necked flask having an inner volume of 5 liters and equipped with a stirrer, a cooling pipe, a dropping funnel with a bypass, and the inside of the flask was vacuum degassed and substituted with nitrogen. Thereafter, 121 g of 1-hydroxycyclohexylphenyl ketone (Irgacure 184 of Ciba Geigy Co., Ltd.; optically radical polymerization initiator) was added under an ultraviolet light shielded environment and mixed and stirred at 25° C. until it completely dissolved (mixing and stirring time of about 1 hour) to give a photocurable resin composition which was a colorless transparent viscous liquid (viscosity of about 2,500 cps at normal temperature).

Example 2: Preparation of Photocurable Resin Composition 1,000 g of the imidated acrylate B obtained in Synthesis Example 2, 1,010 g of the radical polymerizable compound mixture obtained in Synthesis Example 3 and 400 g of dicyclopentanyl diacrylate were charged into a three-necked flask having an inner volume of 5 liters and equipped with a stirrer, a cooling pipe, a dropping funnel with a bypass, and the inside of the flask was vacuum degassed and substituted with nitrogen. Thereafter, 75 g of 1-hydroxycyclohexylphenyl ketone which was identical to that used in Example 1 was added under an ultraviolet light shielded environment and mixed and stirred at 250° C. until it completely dissolved (mixing and stirring time of about 1 hour) to give a photocurable resin composition which was a colorless transparent viscous liquid (viscosity of about 7,500 cps at normal temperature).

Example 3: Preparation of Photocurable Resin Composition 1,400 g of the imidated acrylate A obtained in Synthesis Example 1, 1,400 g of morpholine acrylamide and 1,200 g of dicyclopentanyl diacrylate were charged into a three-necked flask having an inner volume of 5 liters and equipped with a stirrer, a cooling pipe, a dropping funnel with a bypass, and the inside of the flask was vacuum degassed and substituted with nitrogen. Thereafter, 120 g of 1-hydroxycyclohexylphenyl ketone which was identical to that used in Example 1 was added under an ultraviolet light shielded environment and mixed and stirred at 250° C. until it completely dissolved (mixing and stirring time of about 1 hour) to give a photocurable resin composition which was a colorless transparent viscous liquid (viscosity of about 3,800 cps at normal temperature).

Reference Example 1: Preparation of Photocurable Resin Composition 2,020 g of the radical polymerizable compound mixture obtained in Synthesis Example 3 and 2,020 g of dicyclopentanyl diacrylate were charged into a three-necked flask having an inner volume of 5 liters and equipped with a stirrer, a cooling pipe, a dropping funnel with a bypass, and the inside of the flask was vacuum degassed and substituted with nitrogen. Thereafter, 121 g of 1-hydroxycyclohexylphenyl ketone which was identical to that used in Example 1 was added under an ultraviolet light shielded environment and mixed and stirred at 25° C. until it completely dissolved (mixing and stirring time of about 1 hour) to give a photocurable resin composition which was a colorless transparent viscous liquid (viscosity of about 1,500 cps at normal temperature).

Example 4: Production of Optically Cured Molded Product by Molding (1) After the photocurable resin composition prepared in Example 1 was injected into a transparent silicon mold having a cavity shaped like a JIS K 7113-based dumbbell specimen, the resin composition was exposed to ultraviolet radiation from the entire surface of the silicon mold with a 30 W ultraviolet lamp for 15 minutes to be optically cured so as to produce a molded product shaped like a dumbbell specimen. A molded product (dumbbell specimen) having excellent transparency was obtained. When this molded product was taken out from the mold and measured for its tensile properties (tensile strength, tensile elongation and modulus in tension) in accordance with JIS K 7113, the results shown in Table 1 below were obtained.

(2) When the heat distortion temperature of the dumbbell specimen obtained in (1) above was measured by method A (load of 18.5 kg/mm$^2$) in accordance with JIS K 7207, the result shown in Table 1 was obtained.

(3) When the specific gravity ($d_1$) of the photocurable resin composition used for molding in Example 4 before photo curing and the specific gravity ($d_2$) of the obtained molded product (dumbbell specimen) were measured to obtain a volume shrinkage factor thereof by the following equation (1), the result shown in Table 1 below was obtained.

$$\text{volume shrinkage factor } (\%) = \{(d_2 - d_1)/d_2\} \times 100 \quad (1)$$

Example 5: Production of Three-dimensional Object by Stereolithography Method

The photocurable resin composition obtained in Example 1 was optically shaped using an ultra high speed optical shaping system (SOLIFORM500 of Teijin Seiki Co., Ltd.) by irradiating water-cooled Ar laser beams (output of 500 mW, wavelength of 333, 351, 364 nm) at right angles to the surface with an exposure energy of 20 to 30 mJ/cm$^2$ at a slice pitch (thickness of each layer) of 0.127 mm for an average shaping time per layer of 2 minutes to produce a three-dimensional object shaped like a JIS K 7113-based dumbbell specimen. When the obtained three-dimensional object was washed with isopropyl alcohol to remove an uncured resin solution adhered to the three-dimensional object and post-cured through 10 minutes of exposure to 3 KW of ultraviolet radiation, a three-dimensional object having excellent transparency was obtained. When the tensile properties (tensile strength, tensile elongation and modulus in tension) of the three-dimensional object (dumbbell specimen) were measured in accordance with JIS K 7113, the results shown in Table 1 below were obtained.

When the heat distortion temperature of the post-cured dumbbell specimen (three-dimensional object) obtained above was measured in the same manner as in Example 4, the result shown in Table 1 below was obtained.

Further, when the specific gravity ($d_1$) of the photocurable resin composition used for stereolithography method of Example 5 before photo curing and the specific gravity ($d_2$) of the post-cured three-dimensional object were measured to obtain a volume shrinkage factor thereof by the above equation (1), the result shown in Table 1 below was obtained.

Example 6: Production of Three-dimensional object by Stereolithography Method

A three-dimensional object (dumbbell specimen) having excellent transparency was produced by optically shaping a three-dimensional object, and washing and post-curing an uncured resin in the same manner as in Example 5 except that the photocurable resin composition obtained in Example 2 was used. When the tensile properties, heat distortion temperature and volume shrinkage factor of the obtained dumbbell specimen (three-dimensional object) were measured in the same manner as in Example 5, the results shown in Table 1 were obtained.

Example 7: Production of Three-dimensional Object by Stereolithography Method

A three-dimensional object (dumbbell specimen) having excellent transparency was produced by optically shaping a three-dimensional object, and washing and post-curing an uncured resin in the same manner as in Example 5 except that the photocurable resin composition obtained in Example 3 was used. When the tensile properties, heat distortion temperature and volume shrinkage factor of the obtained dumbbell specimen (three-dimensional object) were measured in the same manner as in Example 5, the results shown in Table 1 were obtained.

Reference Example 2: Production of Three-dimensional Object by Stereolithography Method A transparent three-dimensional object (dumbbell specimen) was produced by optically shaping a three-dimensional object, and washing and post-curing an uncured resin in the same manner as in Example. 5 except that the photocurable resin composition obtained in Reference Example 1 was used. When the tensile properties, heat distortion temperature and volume shrinkage factor of the obtained dumbbell specimen (three-dimensional object) were measured in the same manner as in Example 5, the results shown in Table 1 were obtained.

TABLE 1

| Example | photocurable resin composition | production method | dumbbell specimen (optically cured product) | | | | volume shrinkage factor[1] (%) |
| | | | tensile strength (kg/mm$^2$) | tensile elongation (%) | modulus in tension (kg/mm$^2$) | heat distortion temperature (° C.) | |
| --- | --- | --- | --- | --- | --- | --- | --- |
| Ex. 4 | Ex. 1 | molding | 8.9 | 5.7 | 304 | 250 | 5.7 |
| Ex. 5 | Ex. 1 | stereolithography | 8.7 | 4.6 | 290 | 255 | 5.5 |
| Ex. 6 | Ex. 2 | stereolithography | 9.1 | 5.1 | 311 | 270 | 6.0 |
| Ex. 7 | Ex. 3 | stereolithography | 9.4 | 5.6 | 321 | 275 | 5.5 |
| Ref. Ex. 2 | Ref. Ex. 1 | stereolithography | 6.8 | 1.5 | 294 | 270 | 7.2 |

Ex.: Example
Ref. Ex.: Reference Example
[1]volume shrinkage factor at the time of photo curing It is understood from the results of Table 1 above that moldings or three-dimensional objects which have excellent tensile properties such as tensile strength, tensile elongation and modulus in tension and excellent heat resistance with a high heat distortion temperature can be produced with high dimensional accuracy with a small volume shrinkage factor in Examples 4 to 7 in which molding or stereolithography is carried out under exposure using the photocurable resin compositions of Examples 1 to 3 containing the imidated acrylic compound (I).

Since the photocurable resin composition of the present invention is a liquid having relatively low viscosity and excellent handling properties and can be cured in a short period of time, it can be effectively used for the manufacture of moldings, three-dimensional objects and other products by an exposure method.

Since the photocurable resin composition of the present invention has a small volume shrinkage factor at the time of photo curing, moldings and three-dimensional objects having excellent dimensional accuracy can be obtained smoothly by exposure molding and stereolithography.

Optically cured products such as moldings and three-dimensional objects obtained by optically curing the photocurable resin composition of the present invention have extremely excellent heat resistance with a heat distortion temperature higher than 250° C. and excellent mechanical properties such as high tensile strength, tensile elongation and modulus in tension.

What is claimed is:

1. A process of optically shaping a photocurable resin composition into a three-dimensional object comprising the steps of:

(A) irradiating a photocurable resin composition with activation energy beams to obtain a cured layer having a desired pattern, wherein the photocurable resin composition comprising:

(i) at least one imidated acrylic compound represented by the following formula (1):

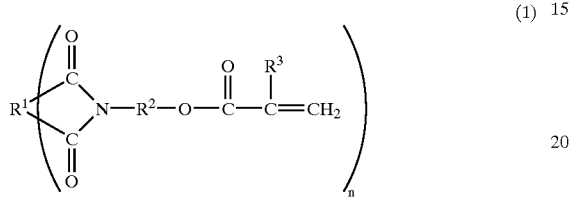

wherein $R^1$ is an alicyclic group which may be substituted, an aromatic group which may be substituted or an aliphatic group which may be substituted, $R^2$ is a residual group of aminoalcohol, $R^3$ is a hydrogen atom or methyl group, and n is 1 or 2;

(ii) at least one polymerizable compound selected from the group consisting of a radical polymerizable compound and a cationic polymerizable compound other than the above imidated acrylic compound; and (iii) a photopolymerization initiator, the weight ratio of the imidated acrylic compound (i) to the polymerizable compound (ii) being 80:20 to 10:90;

(B) supplying the uncured liquid photocurable resin composition onto the cured layer;

(C) irradiating the photocurable resin composition with activation energy beams to form a cured layer on the above cured layer;

(D) forming the three-dimensional object by repeating steps (B) and (C).

* * * * *